United States Patent [19]

Yamamoto

[11] Patent Number: 4,992,291

[45] Date of Patent: Feb. 12, 1991

[54] COAGULANT FOR SOYBEAN MILK AND SOYBEAN FOOD USING SUCH COAGULANT

[76] Inventor: Tokuzo Yamamoto, 10965-3, Yoshino-cho, Kagoshima-shi, Kagoshima 892, Japan

[21] Appl. No.: 386,732

[22] Filed: Jul. 31, 1989

[51] Int. Cl.$^5$ ............................ A23J 3/16; A23J 1/14
[52] U.S. Cl. ..................................... 426/573; 426/574; 426/634; 426/656
[58] Field of Search ............... 426/573, 656, 599, 574, 426/634

[56] References Cited

U.S. PATENT DOCUMENTS 4,391,835  7/1983  Katayama et al. ................... 426/573
4,673,583  6/1987  Kuwata et al. ...................... 426/573

FOREIGN PATENT DOCUMENTS 120047  7/1984  Japan .
016581  1/1985  Japan .
149065  7/1986  Japan .
3287454 11/1988 Japan ................................. 426/573

Primary Examiner—Jeanette Hunter
Attorney, Agent, or Firm—Michael L. Keller

[57] ABSTRACT

A soybeam milk coagulant containing water-soluble calcium from juices of vegetables of high calcium content provides soybean curd having improved flavor, taste, and enriched nutritives.

4 Claims, No Drawings

COAGULANT FOR SOYBEAN MILK AND SOYBEAN FOOD USING SUCH COAGULANT

BACKGROUND OF THE INVENTION

1. Field of the Invention

The present invention concerns a soybean milk coagulant of vegetable origin and soybean protein foods containing such a coagulant.

2. Description of the Prior Art

Soybean curd as a kind of soybean protein foods contain vegetable protein and various other nutrient elements in a well-balanced form and has become popular in recent years as healthy vegetable foods.

For the production of soybean curd, magnesium chloride, calcium chloride or calcium sulfate has traditionally been used as a coagulant for soybean milk (intermediate product of the soybean curd). However, such inorganic additives often involve deleterious impurity such as heavy metals which may be incorporated in the industrial step of production although in a trace amount.

As an organic coagulant delta-gluconic lactone has been used recently. However, it may be said that safety of the chemical has not yet been demonstrated completely, for example, considering that the strong effect of the delta-lactone of removing dental calculus.

Thus, although the soybean curd itself is favorable healthy food of low calorie comprising vegetable protein, additives used therefor may cause a safety problem.

Apart from this, there is another problem for soybean curd in that it is tasteless and has slight beany flavor.

SUMMARY OF THE INVENTION

Accordingly, it is an object of the present invention to provide a coagulant for the protein in soybean milk, which causes no problem at all in view of health, has high nutrient values and gives favorable natural taste.

Another object of the present invention is to provide a soybean protein food such as soybean curd or soybean milk drink with no safety problem, having well-balanced nutrient values and of favorable taste and flavor.

The present inventor has unexpectedly found that a juice squeezed from certain kinds of vegetables can effectively coagulate the soybean milk and, in addition, give favorable natural taste and flavor to the resultant soybean curd, etc. and has accomplished the present invention.

The foregoing objects of the present invention can be attained by a soybean milk coagulant comprising water-soluble calcium contained in a juice squeezed from vegatables of high calcium content.

According to the coagulant of the present invention, since the protein in the soybean milk is coagulated by the effect of calcium ions derived from water-soluble calcium salt contained in the vegetables substantially completely just like the traditional coagulants used for soybean curd production.

Since no chemical coagulant is used, the resultant soybean curd is quite free from the problem in view of health. In addition, the soybean protein food according to the present invention comprising soybean milk and the cogulant as described above has favorable taste and color, and enriched nutritives such as easily absorbable calcium derived from the vegetables.

If necessary, natural dye such as carotin, vitamines, minerals, amino acids, etc. may also be added. Since considerable portions of vitamines, amino acid, minerals, etc. originally contained in soybean are transferred to soybean curd refuse, this will be effective for recoverying them in the soybean curd.

The vegetables of high calcium content that can be used as the starting material for the the soybean milk coagulant in the present invention are selected from those vegetables containing at least 100 mg, preferably, at least 150 mg of water-soluble calcium based on 100 g of a juice squeezed therefrom.

Specific examples of such vegetables containing high calcium content are kale (variety of cabbage) (Ca content: 310 mg/100 g), cabbage (outer leaves) (Ca: 150–400 mg/100 g), radish (leaves) (Ca: 210 mg/100 g), shepherd's purse (Ca: 300 mg/100 g), Komatsuna (*Brassica campestris* L) (Ca: 290 mg/100 g), red pepper (leaves) (Ca: 640 mg/100 g) and basil (Ca: 220 mg/100 g), although not restricted only to them. They may be used alone or as a combination of two or more of them.

If the calcium content is less than 150 mg, it requires too much vegetable juice for effective coagulation of the soybean milk, which may worsen the plain taste of the soybean curd.

The coagulant may be formulated in the form of a solution as just squeezed from vegetables, concentrate or freeze-dry powder prepared therefrom. The juiced can be prepared by grinding fresh vegetables into a paste-like form and then squeezing the same.

The coagulant juice is preferably used as soon as possible after the preparation. In a case when it is used after a certain period of time, it may desirably be sterilized under heating and then preserved at low temperature, for example, lower than 5° C.

Further, if it is frozen, it can be stored for a long period of time to provide an industrial advantage for the production control.

Explanation is then be made briefly for the preparation of the soybean protein food according to the present invention.

For instance, in a case of preparing soybean curd (tofu), the procedures are basically the same as in the case of the production of usual soybean curd. At first, the starting soybean is immersed in water and swollen under a room temperature. Then, water is added by from 500 to 1,100 parts by weight based on 100 parts by weight of the dry weight of the soybean, which is then ground to prepare an aqueous slurry of soybean. In a case, if the coagulant in the form of a juice squeezed out from vegetables of high water content is added in the subsequent step, the amount of water added here is controlled while considering the water content of the coagulant. Then, the ground product is boiled for several minutes, filtered and separated into soybean milk and soybean curd refuse.

Then, juiced leaves of cabbage is added as a soybean milk coagulant containing the ingredients, in particular, water-soluble calcium to coagulate the soybean milk while maintaining the temperature to 70°–80° C. till the completion of the addition. Water-soluble calcium from the vegetables causes the protein in the soybean milk to coagulate to form gel-like tofu. At the same time, various other ingredients such as chlorophyll, carotin, etc. form composite body with the protein in the soybean milk during coagulation, to provide the soybean curd with vegetable-like taste and flavor, and with enriched nutritives.

The amount of the soybean milk coagulant to the soybean in the soybean protein food according to the present invention can be selected from a wide range in accordance with the aimed products.

For instance, in the case of a soybean curd, it is preferred that the soybean milk coagulant is added by an amount in a range from 10 to 40 mg, on the basis of the water-soluble calcium, to 100 g of the soybean milk.

In a case where the amount of the coagulant is not greater than 10 mg, coagulation of the soybean milk is insufficient to result in only a viscous slurry-like liquid. Such a product can be used as soybean milk drinks.

On the other hand, if the amount of the coagulant is over 40 mg, coagulation occurs not homogenously and also excessively to cause lumpy coagulation products. Such a product can be properly processed further and used as yogurt-like soybean protein food.

In the case of using the concentrate or freeze-dry powder obtained from the juiced vegetables as the soybean coagulant, they may be diluted with water to such an extent as corresponding to the amount of the raw juice.

EXAMPLE

The present invention is to be explained referring to the examples, but it should be noted that the invention is not restricted only to the example.

After immersing soybean in water over one night, the swollen soybean was taken out and 900 parts by weight of water was added, on dry bases, based on 100 parts by weight of soybean, which were then ground into an aqueous slurry. Then, the slurry was boiled for 8 min and then filtered under pressing through cotton cloth to prepare soybean milk.

Separately, outer leaves of fresh cabbage plant was squeezed by a juicer and the juice was filtered through a gauze. As a result of the analysis for the filtrate, it contained 156 mg of water-soluble calcium in 100 g of the filtrate.

The cabbage filtrate was added by 13 parts by weight based on 100 parts by weight of the soybean milk prepared as described above at 80° C. and cast into a rectangular wooden casing. The resultant soybean curd has acceptable pale green color and natural taste, enriched with calcium and vitamines derived from cabbage and thus improved as natural health food.

FUNCTIONAL TEST

The soybean curd obtained in the example above was served to about 4700 usual panellers as it was in the form of platelet specimens ($2 \times 3 \times 1$ cm) and tested for taste, color, flavor and palate in comparison with usual soybean curd (from Mar. 16 to June 15, 1989). The results were expressed by percentage as shown below.
Taste: Good (76%), ordinary (22.9%), poor (0.5%)
Color: Good (87.7%), strange (10.6%)
Flavor: Good (40.1%), ordinary (54.1%), poor (1.2%)
Feeling of palate: Good (65.6%), ordinary (25.8%), hard (6.3%).

What is claimed is:

1. A soybean curd comprising an aqueous slurry of ground soybean and a juice obtained from leaves of vegetables used as the only coagulant for gelling the soybean slurry, said juice containing at least 100 mg of water-soluble calcium based on 100 g of said juice.

2. A soybean curd as defined in claim 1, wherein the vegetables are selected from the group consisting of kale, cabbage, radish, shepherd's purse, Brassica compesteris L, red pepper and basil.

3. A soybean curd as defined in claim 1, further comprising other nutritive ingredients, minerals, fruit juices and/or natural dye.

4. A process for producing soybean curd which comprises:
   immersing and swelling soybean in water at room temperature, adding from 500 to 1100 parts by weight of water to 100 parts by weight of the thus swollen soybean and grinding a mixture of soybean and water into an aqueous slurry of soybean and heating to boil said aqueous slurry;
   separating said aqueous slurry by filtration into soybean milk and soybean refuge;
   adding a juice obtained from leaves of vegetables which contain at least 100 mg of water-soluble calcium based on 100 g of said juice while maintaining the temperature to 70–80 degree C.; and
   standing the combined juice and milk to allow the combined juice and milk to cool and coagulate to form gel-like soybean curd, the coagulation occurring solely as a result of the water-soluble calcium in the juice.

* * * * *